Figure 1:
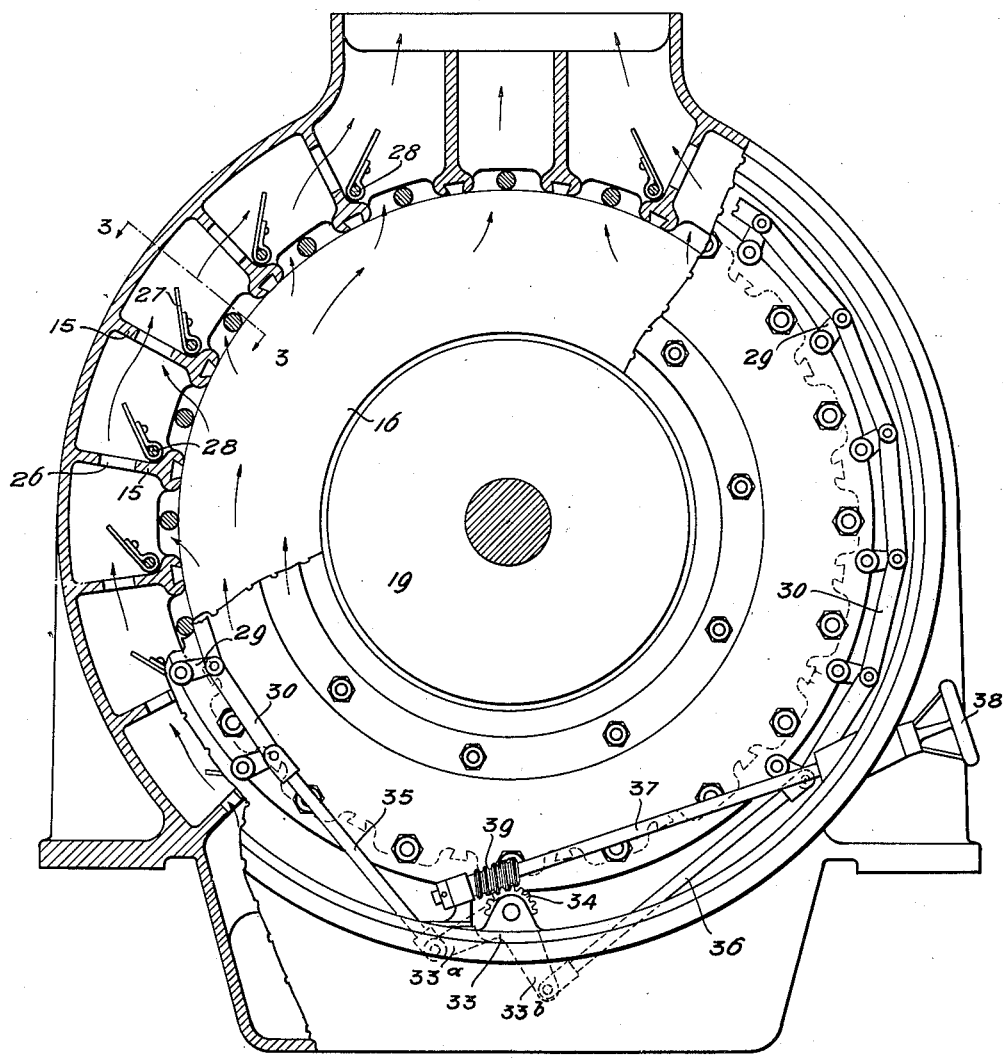

A. F. KWIS.
DYNAMO ELECTRIC MACHINE.
APPLICATION FILED MAY 13, 1909.

992,883.

Patented May 23, 1911.

2 SHEETS—SHEET 2.

UNITED STATES PATENT OFFICE.

ARTHUR F. KWIS, OF CLEVELAND, OHIO, ASSIGNOR TO ALLIS-CHALMERS COMPANY, A CORPORATION OF NEW JERSEY.

DYNAMO-ELECTRIC MACHINE.

992,883.   Specification of Letters Patent.   Patented May 23, 1911.

Application filed May 13, 1909. Serial No. 495,760.

*To all whom it may concern:*

Be it known that I, ARTHUR F. KWIS, a citizen of the United States, residing at Cleveland, in the county of Cuyahoga and State of Ohio, have invented certain new and useful Improvements in Dynamo-Electric Machines, of which the following is a full, clear, and exact specification.

This invention relates to dynamo-electric machines and particularly to high speed machines such as turbo generators which are inclosed in housings provided for the purpose of deadening the noise due to high speeds of rotation and to secure an ample ventilation and dissipation of the heat generated in the machine.

More particularly the invention relates to that type of machine which is provided with a housing having circumferentially spaced ribs on which the stationary or stator core is mounted, and which is cooled by air which is forced through the stator core from one side thereof to the other, generally from the bottom of the machine to the top, where exhaust openings are provided.

One of the objects of the invention is the provision of means whereby the stator core and particularly the outer portion thereof may be effectively cooled and whereby a circulation of air may be maintained between the outer periphery of the core and the annular wall of the housing through the ribs which support the stator core.

A further object is the provision of means whereby the relative volumes of air passing through the stator core and between the latter and the surrounding wall of the housing may be readily varied.

The invention may be briefly summarized as consisting in certain novel details of construction and combinations and arrangements of parts which will be described in the specification and set forth in the appended claims.

Reference is had to the accompanying sheets of drawings, in which—

Figure 2:
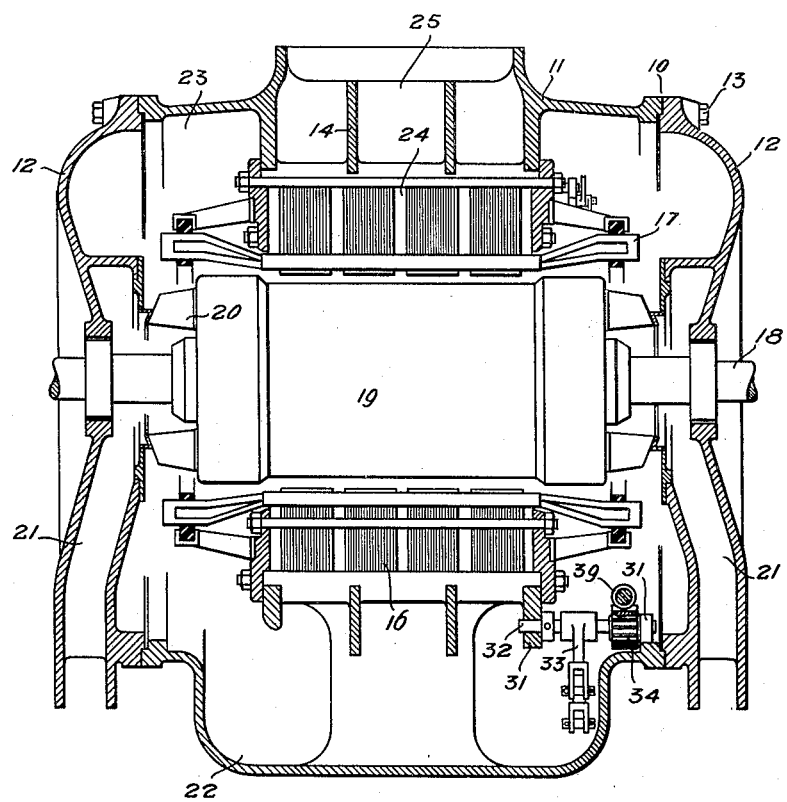
Figure 3:
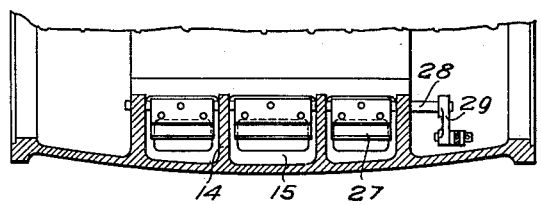

Figure 1 is a transverse vertical sectional view taken through an inclosed dynamo-electric machine constructed in accordance with my invention, parts being in elevation and parts being broken away for the sake of clearness; Fig. 2 is a longitudinal vertical sectional view taken through substantially the center of the machine; and Fig. 3 is a partial transverse section substantially along the line 3—3 of Fig. 1 looking in the direction indicated by the arrows.

In the figures of the drawing wherein I have shown an inclosed high speed dynamo-electric machine, 10 represents the inclosing housing which consists of a main or middle portion 11 and end portions 12 which are secured by bolts 13 to the ends of the portion 11. The middle portion 11 of the housing is provided with axially spaced annular ribs 14 and with circumferentially spaced radial ribs 15 which are provided to strengthen the housing, and on which the laminated stator or stationary armature core 16 is supported and secured preferably by dovetailed connections, said core 16 being provided with the usual slots which receive the stator winding 17. Extending through openings in the end portions 12 of the housing is a rotary shaft 18 on which the rotor or rotary field member 19 is mounted, this member being shown somewhat conventionally in Figs. 1 and 2.

The machine here shown is designed to be cooled by air which is forced by fans or blowers 20 on the ends of the rotor, into the housing and thence upwardly through the machine on both sides of the rotor. The air is led into the housing by air conduits 21 which are formed in the end portions 12 of the housing and which extend upwardly about the shaft, the upper ends of the conduits being provided with annular openings which surround the shaft adjacent the blowers 20. At the lower part of the housing and below the stator core 16 is an air chamber 22 which receives the air from annular chambers or spaces 23 between the stator core and the end portions 12 of the housing and which communicates with axially spaced circumferential passageways 24 provided in the core. At the upper part of the housing is a chimney or outlet 25 for the air.

As machines of this type are ordinarily constructed, the air passes from the air receiving chamber 22 upwardly in parallel planes through the passageways 24 in the core on both sides of the rotor 19, and thence escapes from the housing through the chimney 25. In order that the heated air may not be pocketed between the radial ribs 15, I provide in all the radial ribs 15 between the air receiving chamber 22 and the chimney 25, on both sides of the rotor, air openings 26 which permit an upward circulation of air between the outer periphery of the stator core 16 and the annular wall of the housing. Inasmuch as the air pressure is greater at the lower part of the machine adjacent the air receiving chamber 22, and as the air is cooler at this part than at the top, the openings 26 in the ribs are made successively larger from the lowermost ribs to the ribs adjacent the chimney 25. With this construction the major portion of the air will pass upwardly from the chamber 22 through the stator core, but a portion thereof will pass from the chamber 22 through the openings in the lower radial ribs between the core and the housing, and inasmuch as the openings are successively larger from the bottom toward the top a portion of the air after passing part way through the stator core will pass outwardly beyond the core through the spaces between the ribs and will thence pass to the chimney as indicated by the arrows in Fig. 1. Furthermore with this construction the air may pass upwardly more freely and consequently there will be a smaller rise in temperature due to the friction of the air than if the air all passed through the core only. In order that the relative volumes of the air passing through the stator core and between the core and the housing may be readily varied, I provide dampers for these various openings in the ribs, together with means for simultaneously shifting the dampers. In this case the dampers consist of plates 27 which are secured to rods 28 extending transversely through the axially spaced annular ribs 14 adjacent to the circumferentially spaced radial ribs 15, so that if the rods are turned the damper plates are swung toward or away from the corresponding openings in the ribs and the effective sizes of the openings are thereby varied. The rods extend outwardly beyond one side of the stator core and are provided at their outer or free ends with crank-arms 29. The crank-arms on each side of the rotor 19 are connected together by means of links 30, so that the groups or series of dampers on each side of the rotor will move simultaneously.

Rotatably mounted in the lower part of the machine in bearings 31 carried by the housing is a shaft 32, to which is secured a bell-crank lever 33 having arms 33ª and 33ᵇ arranged at right angles to each other and secured also to the shaft 32 is a worm wheel 34. As is shown clearly in Fig. 1 one of the ends 33ª of the bell crank is connected by a link or arm 35 to one group or series of interconnected crank arms 29 on one side of the rotor, and the other arm 33ᵇ is connected by a link or arm 36 to the other series of interconnected crank arms 29 on the opposite side of the rotor. The shaft 32 may be turned from the exterior of the housing, so as to shift the dampers toward or away from the openings in the corresponding ribs 15 by means of a shaft 37, which extends through the wall of the housing and is provided at its outer end with a hand wheel 38 and at its inner end with a worm 39, which engages the worm wheel 34 on the shaft 32.

In case it is found that too much or not sufficient air is passing through the core, and if it is desired to vary the relative volumes of air passing through the core between the latter and the housing, all that is necessary is to turn the hand wheel in one direction or the other so as to simultaneously shift the dampers toward or away from the openings in the ribs and thereby vary the effective sizes of the openings.

I do not desire to be confined to the exact details shown but aim in my claims to cover all modifications which do not involve a departure from the spirit and scope of my invention.

What I claim as new and desire to secure by Letters Patent is:—

1. In combination, in a dynamo-electric machine, a housing having inwardly projecting ribs provided with air openings, a stator core having ventilating passageways and supported by said ribs, means for causing a circulation of air to take place from one side of the machine to the other through the core and between the core and the housing through the openings in the ribs, dampers for the openings in the ribs, and means for simultaneously adjusting said dampers.

2. In combination, a dynamo-electric machine, a housing having inwardly projecting circumferentially spaced ribs provided with air openings, a stator core having ventilating passageways and supported by the ribs, means for causing a circulation of air to take place through the core from one side to the other and between the core and the housing, dampers for the openings in the ribs, and means for simultaneously adjusting all the dampers from exterior of the machine.

3. A dynamo-electric machine, a housing having circumferentially spaced inwardly projecting ribs provided with ventilating openings, an annular core having ventilating passageways and supported by said ribs, means for forcing air through the stator core and between the latter and the housing from one side of the machine to the other, dampers for the openings in the ribs, and means for simultaneously swinging said dampers toward and away from the ribs, so as to vary the relative volumes of air passing through the stator core and between the latter and the housing.

4. A housing having circumferentially spaced inwardly projecting ribs, and having at one side thereof an air receiving chamber and at the opposite side an air exhaust opening, a stator core supported by said ribs and having axially spaced ventilated passageways which communicate with said air receiving chamber and with said exhaust opening, a rotor, all the ribs between the air receiving chamber and exhaust opening on both sides of the rotor having air openings, means for forcing air through the stator core and between the latter and the surrounding portion of the housing through the openings in the ribs, dampers for said openings, each damper being arranged adjacent one of the ribs, and mechanism for simultaneously shifting said dampers so as to vary the relative volumes of air passing through the stator core and through the openings in the ribs.

5. In a dynamo-electric machine, a housing having circumferentially spaced inwardly projecting ribs, each provided with an air opening, and said housing having at the lower part thereof an air receiving chamber and at the top exhaust openings, a stator core supported by said ribs and provided with axially spaced circumferential ventilating passageways which communicate with the air receiving chamber and with the exhaust openings, the ribs on both sides of the rotor between the air receiving chamber and the exhaust openings having air openings, axially arranged rods rotatably mounted adjacent the ribs, damper plates secured to said rods, means for forcing air into said air receiving chamber, thence upwardly through the stator core and between the latter and the surrounding portion of the housing through the openings in the ribs, and means operative from the exterior of the housing for simultaneously rocking said rods so as to shift the damper plates toward or away from the ribs.

6. In a dynamo-electric machine, a housing having circumferentially spaced inwardly projecting ribs and axially spaced annular ribs, an annular stator core having ventilating passageways and supported by said ribs, a rotor, said housing having at one side thereof an air receiving chamber and at the opposite side air exhaust openings, said air exhaust openings and chamber communicating with the passageways of the stator core, the circumferentially spaced ribs between the air receiving chamber and the exhaust openings on both sides of the rotor having air openings, means for forcing air into said chamber and thence through the core and between the latter and the surrounding portion of the housing through the openings in the ribs on both sides of the rotor, a plurality of rods extending through the axially spaced ribs adjacent the circumferentially spaced ribs, damper plates secured to said rods, links connecting together the rods on each side of the rotor, and mechanism for simultaneously shifting both series of inter-connected rods and the dampers carried thereby.

7. In a dynamo-electric machine, a housing having inwardly projecting circumferentially spaced ribs, an annular stator core having a ventilating opening and supported by said ribs, a rotor, the circumferentially spaced ribs on each side of the rotor having air openings, means for forcing air through the stator core and between the latter and the housing from one side of the machine to the other, the openings in the ribs adjacent the point of air admission to the machine being smaller than the openings in the ribs adjacent the point of air exhaust from the machine.

8. In a dynamo-electric machine, a housing having inwardly projecting circumferentially spaced ribs, an annular stator core having a ventilating opening and supported by said ribs, a rotor, the circumferentially spaced ribs on each side of the rotor having air openings, means for forcing air through the stator core and between the latter and the housing from one side of the machine to the other, the openings in the ribs being of gradually increasing sizes from the side of the core at which the air enters to the side through which the air escapes.

9. In a dynamo-electric machine, a housing provided with circumferentially spaced inwardly projecting ribs and provided at the bottom with an air receiving chamber and at the top with an exhaust opening, an annular stator core mounted on the ribs and provided with axially spaced ventilating passageways, and a rotor, said ribs on each side of the rotor between the air receiving chamber and exhaust opening having air openings, the openings being of gradually increasing sizes from the air receiving chamber to the exhaust openings.

Milwaukee, Wis., Apr. 23, 1909.

In testimony whereof I affix my signature, in the presence of two witnesses.

ARTHUR F. KWIS.

Witnesses:
 CHAS. L. BYRON,
 ROB. E. HALL.